May 20, 1930.  C. L. HOEY  1,759,699
SPINNING POT OR CENTRIFUGE
Filed Jan. 26, 1929
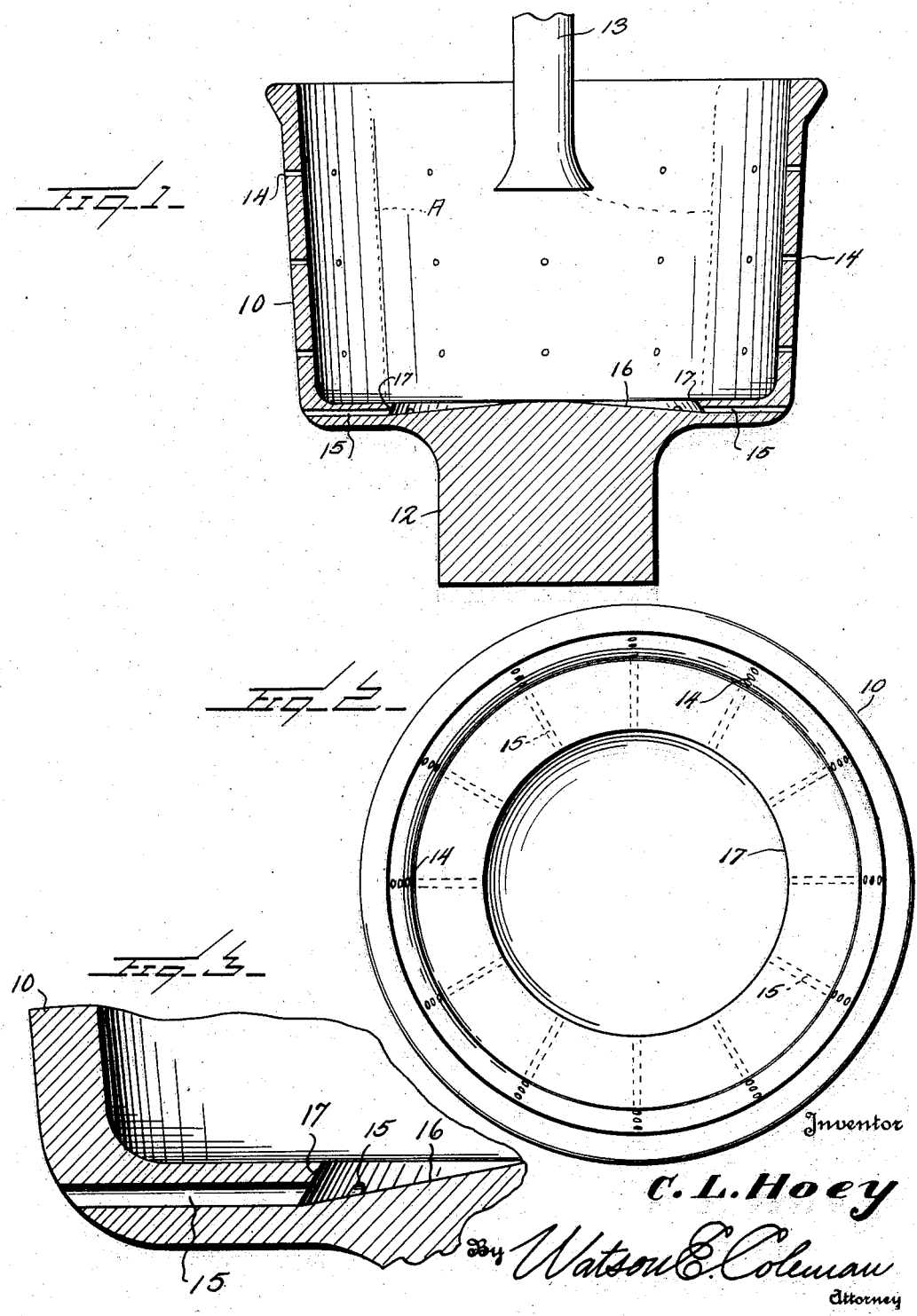
Inventor
C. L. Hoey
By Watson E. Coleman
Attorney Patented May 20, 1930

1,759,699

UNITED STATES PATENT OFFICE

CLAYTON L. HOEY, OF FREDERICA, DELAWARE

SPINNING POT OR CENTRIFUGE

Application filed January 26, 1929. Serial No. 335,239.

This invention relates to what are known as spinning pots or spinning buckets used in the production of artificial silk or rayon. In the manufacture of rayon, artificial silk in the form of threads issuing from the spinnerettes of artificial silk manufacturing machines is led to a vertically disposed guide tube which is vertically reciprocated within the bucket or pot, the bucket or pot being rotated at a very high rate of speed as for instance at a speed of 10,000 R. P. M. The thread or filament led into the bucket through the tube is caught to the side of the bucket or pot and as the pot rotates, this thread is wound around the interior of the pot to form what is technically known as a cake. Some of the liquid from the precipitating bath is carried over by these threads into the bucket or pot and if not removed will collect within the pot and tend to unbalance it, thus setting up vibrations in the pot which are particularly objectionable. Furthermore, it is often necessary to wash off the relatively weak threads when they are first carried through the tubular guide and it is necessary to get rid of the washing liquid which may remain in the pot in order to prevent an unbalancing thereof and the setting up of objectionable vibrations.

To this end it is common to provide pots of this character with perforations in their sides so that the centrifugal action of the centrifuge or pot will cause the liquid to be discharged from the threads and from the pots through these perforations. The perforations in the side walls of the pots tend to weaken them so that the centrifugal action upon the rapidly rotating pots will tend in case of any weakness to cause the pots to burst.

The general object of the present invention is to provide means for the discharge of any liquid which may pass into the pot without excessive or any weakening of the walls of the pot by the use of many or any perforations therein, thus materially increasing the strength of the bucket or pot.

A further object is to so construct the pot that any excess of the coagulating or setting bath that drips to the bottom without coming into contact with the coil or cake of rayon may be thrown off without this excess being thrown by centrifugal action against the cake or coil, thus discoloring the rayon cake or coil.

My invention is illustrated in the accompanying drawing, wherein:—

Figure 1 is a vertical sectional view through a spinning pot or centrifuge constructed in accordance with my invention;

Figure 2 is a top plan view thereof;

Figure 3 is an enlarged fragmentary vertical section through the pot.

In the drawing I have shown a standard form of spinning pot, it being understood, however, that the drawing is purely an illustration of the application of my invention to one form of pot and the pot might be modified in shape or configuration without in any way departing from the spirit of the invention as defined in the appended claims.

The pot 10 which is of cast metal has a relatively flat bottom designated generally 11 and a central hub 12 which is adapted to be disposed within the socket of a rotating spindle and either rotated by friction with the spindle or to have positive engagement with the spindle for rotation. Extending downward into the bucket is the usual guide tube 13 flared downward at its lower end in the usual manner and into which the thread from a spinnerette is carried and guided downward through the tube 13 and then is engaged with the side wall of the pot so that as this pot rotates, the thread will be gradually wound up in the form of a coil or "cake" A disposed against the inside face of the bucket or pot, as shown in Figure 1.

The side wall of the bucket may be formed with a plurality of perforations or drainage openings 14 if desired or found necessary, but my invention resides in the provision of passages 15 extending inward radially through the bottom wall 11 of the bucket or pot from the exterior thereof and intersecting a depression 16 in the bottom surface of the pot, the bottom of this depression being very slightly angled or conical.

In other words, this surface which is concentric to the center of rotation of the pot extends upward and centrally at a very slight angle. It is to be noted that the outer wall 17 of the depression is downwardly and outwardly inclined to intersect the passages 15 as shown most clearly in Figure 3. I regard this as an important feature of my invention, though I do not wish to be limited to it except as defined in the claims.

With a pot constructed in accordance with my invention any liquid such as the liquid from the precipitating bath or washing liquid or anything of this nature which drips downward to the bottom of the pot is thrown outward by centrifugal force and is discharged through the passages 15, the openings of the passages 15 intersecting, at a slight inclination, the bottom of the bucket or pot at the overhanging wall 17, and acting to guide any liquid into the channels or passages 15. It is to be particularly noted that the "cake" A is disposed outward of the mouths 17 or entrances of the passages 15 so that by no chance can the "cake" in any way obstruct these passages, whereas were the openings of the passages disposed closely adjacent the side wall of the pot, the "cake" as it slips down under the action of gravity, or if it were led by the reciprocating guide tube 13 close to the bottom of the pot, would tend to obstruct these openings as the "cake" does obstruct the openings 14 oftentimes. There is no chance of the "cake" or coil, therefore, with my device obstructing the drainage openings at all and as a consequence the drainage openings are left clear and free and the centrifugal force will cause the discharge of the liquid through these openings.

I claim:—

1. A centrifuge of the character described having a circular side wall and bottom, the bottom having a central depression inward of the side wall, the bottom of the depression extending upward toward the center at a slight angle to a level with the outer portion of the bottom and the outer wall of the depression overhanging and the bottom of the centrifuge being provided with a plurality of radial passages opening through said outer wall of the depression.

2. A centrifuge of the character described having a side wall and a bottom, the bottom being formed with a central depression and with a plurality of radial passages extending inward from the periphery of the centrifuge and below the surface of the bottom and opening into said depression, the bottom of the centrifuge at the center thereof being upwardly and centrally inclined, the center of the upwardly and centrally inclined portion being approximately on a level with that portion of the bottom outward of the depression.

3. A centrifuge of the character described having a side wall and a bottom, the bottom being formed with a depression and with a plurality of radial passages extending inward from the periphery of the centrifuge and below the surface of the bottom and opening into said depression, the bottom of said depression being upwardly and centrally inclined; the apex of this upwardly inclined bottom being coincident with the vertical axis of the centrifuge.

4. A centrifuge of the character described having a side wall and a bottom, the bottom having a centrally disposed depression concentric to the side wall and the axis of the centrifuge, the bottom of said depression at its center being extended upward to an approximate level with the lower end of the side wall and the bottom having discharge passages opening into the depression.

In testimony whereof I hereunto affix my signature.

CLAYTON L. HOEY.